Sept. 5, 1933. G. W. CRABTREE 1,925,862
FLEXIBLE VEHICLE SPRING CASING
Filed July 20, 1931 2 Sheets-Sheet 1
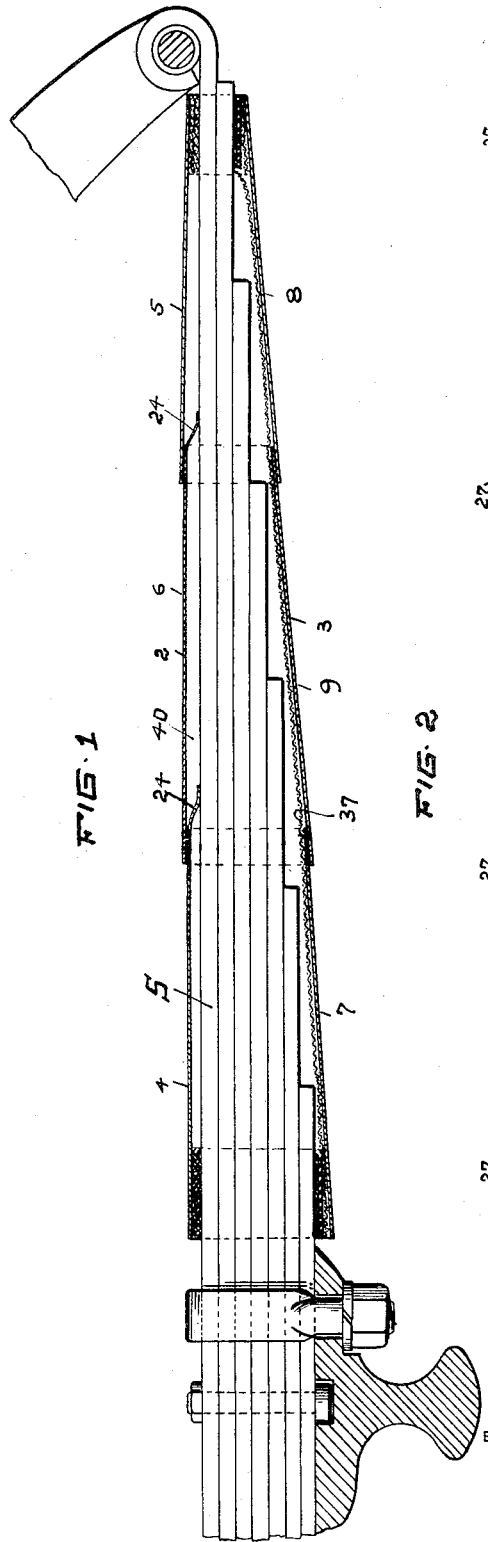
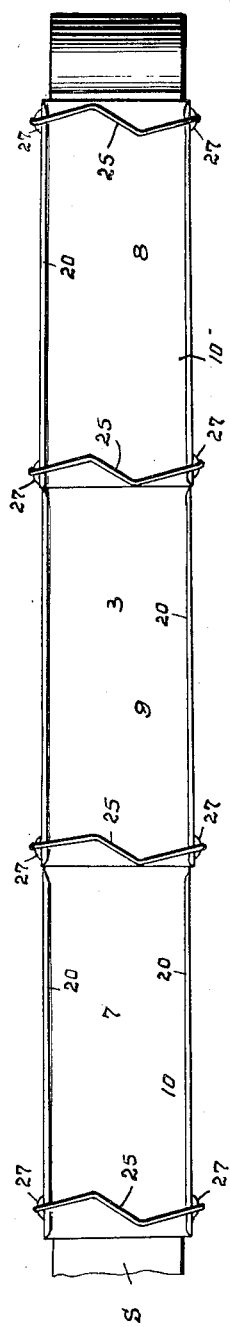
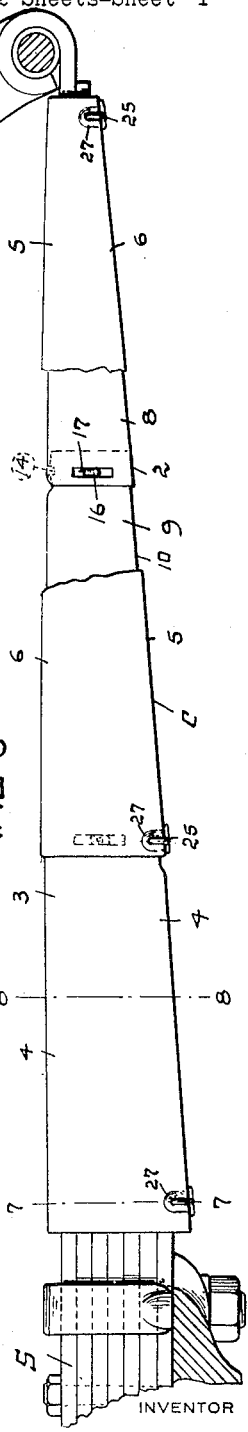
INVENTOR
GEORGE W. CRABTREE
BY
Fisher, Moser + Moore
ATTORNEY Sept. 5, 1933.  G. W. CRABTREE  1,925,862
FLEXIBLE VEHICLE SPRING CASING
Filed July 20, 1931  2 Sheets-Sheet 2
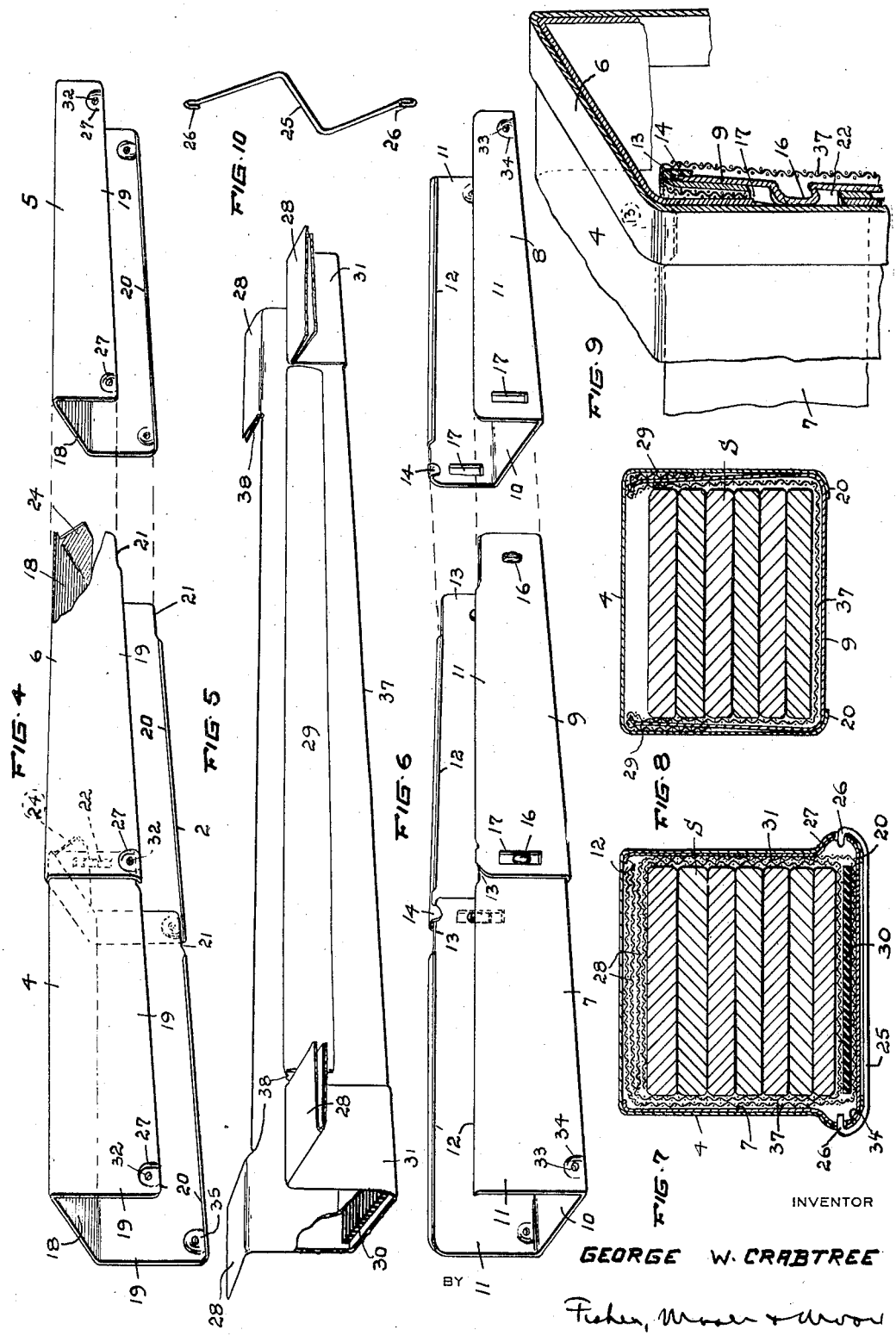
INVENTOR
GEORGE W. CRABTREE
BY
ATTORNEY Patented Sept. 5, 1933

1,925,862

UNITED STATES PATENT OFFICE 1,925,862

FLEXIBLE VEHICLE SPRING CASING

George W. Crabtree, Cleveland Heights, Ohio

Application July 20, 1931. Serial No. 551,927

4 Claims. (Cl. 267—37)

This invention relates to lubricating apparatus, and more particularly to sectional casings for leaf springs commonly employed on motor vehicles and the like. The general object of my invention is the provision of a protective metal covering for a leaf spring so spaced from the spring as to permit the cover carrying a substantial amount of lubricant for the springs, and also to provide for variation in the thickness of the leaves of the spring. A further object of the invention is to provide a sectional cover for springs, the sections of which may be readily connected together and as easily applied to or removed from springs of different lengths and heights. Another object is to provide a sectional metal casing in which a fewer number of and longer sections may be employed as compared with sectional casings for leaf springs now in use, so that free deflection of the spring under varying road conditions will not result in distortion of the casing, with consequent opening of joints. A still further object is to provide a sectional cover for springs in which the tops of the adjoining sections are constantly pressed into tight seating engagement with each other, thus preventing water from leaking through the top joints thereof. With these and other objects in mind my invention consists in the particular arrangement and construction of parts all as hereinafter more fully described in the following description and the drawings forming part thereof and as more concisely pointed out in the claims.

In the drawings, Fig. 1 shows a longitudinal sectional view through a sectional metal casing applied to a leaf spring. Fig. 2 is a bottom view of Fig. 1. Fig. 3 is a side view partly in section and partly broken away, of the sectional cover shown in Fig. 1. Fig. 4 is a perspective view of the top sections of the sectional casing partly assembled or connected together and partly disconnected. Fig. 5 is a perspective view of the cloth lining enclosing the spring within the sectional metal casing. Fig. 6 is a perspective view of the sections of the bottom members of the sectional casing partly connected together and part disconnected. Fig. 7 is a cross sectional view on line 7—7 of Fig. 3. Fig. 8 is a cross sectional view on line 8—8 of Fig. 3. Fig. 9 is an enlarged fragmentary cross sectional view through one of the joints formed when the top and bottom members are assembled, and Fig. 10 a perspective view of one of the spring elements used to clamp the top and bottom members together after the sectional metal casing has been mounted upon a leaf spring.

As shown in the drawings, the opposite ends of a leaf spring S are enclosed by sectional metal casing, comprising a U-shaped or trough-shaped top portion or member 2, and a U-shaped or trough-shaped bottom portion or member 3. The top member 2 is formed of three sections, inner and outer sections 4 and 5, respectively, and a middle section 6, and the bottom member 3 also comprises inner, outer and middle sections 7, 8, and 9, respectively. The side walls of the sections of these two top and bottom members 2 and 3 are of gradually decreasing height from their inner ends outwardly in order to conform the shape of the sectional casing to approximately that of the slanting lines of leaf spring S.

Each section 7, 8, and 9 of the bottom member comprises a bottom wall 10 and vertically disposed side walls or flanges 11, the upper edges of which are bent inwardly or laterally, thus providing flange portions 12. To facilitate interlocking of the sections together, in sleeved or telescopic engagement, a portion of the flange portions 12 is cut away or removed from the outer ends of the inner section 7 and middle section 9, thus providing straight end portions 13, and the inner ends of middle section 9 and outer section 8 are formed with inwardly and downwardly curved tongues 14. When the outer ends of sections 7 and 9 are partially telescoped within the inner ends of sections 9 and 8 respectively, the tongues 14 seat upon the straight end portions 13, previously mentioned. Relative longitudinal movement of the sections 7, 8, and 9 is prevented by means of elongated protuberances 16 formed on the outer ends of the side walls 11 of sections 7 and 9, which protuberances engage in vertically disposed slots 17 in the inner ends of the side walls 11 of sections 8 and 9. This arrangement prevents disconnection of the sections from each other but permits of slight relative vertical shifting movement thereof so that the casing when mounted upon a leaf spring will readily respond to the movements of the spring, under varying road conditions without injury to the casing. The upper longitudinal edges of the sections 7, 8, and 9, are turned inwardly to provide narrow flanges 12 which hook over the top edges of the topmost leaf of the leaf spring S when these sections as a unit are placed in position on the bottom of the spring. The bottom member of the casing may be thus applied as a unit and will require no attention on the part of the workman to hold in place while the sections of the top member 2 are assembled over the spring and over the sides of the bottom member 3, one at a time, as hereinafter explained. The flanges 12 stiffen the top edges of the side walls of the bottom sections; serve as a guide in assembling the two members of the casing on the spring and also fit into the top corners of the sections of the top member with bracing effect.

The three sections 4, 5, and 6, of the top member 2, each comprise a top wall 18 and depending side walls 19, the free edges of which have inwardly extending flanges 20 for engaging the bottom wall of a corresponding section of the bottom member 3, when the two members are mounted upon the spring S. These top sections 4, 5, and 6, like the sections comprising the bottom member, have sleeved connection one with the other. To facilitate partial insertion of one section within the other, the flanges 20 of sections 4 and 6 are cut away or removed for a portion of their length adjacent the outer ends of these sections, thus providing the straight edge portions 21. The side walls 19 of sections 4 and 6 are also formed with vertical slots 22 (corresponding to slot 17) adjacent their inner ends in which elongated protuberances 16 formed in the outer ends of the side walls of sections 7 and 9 of the bottom member 3 also seat when the sections are mounted upon the spring S. Thus, the top sections are locked against relative longitudinal displacement but are free for slight relative vertical shifting movement, as is also true of the sections of the bottom member 3.

Assembly of the sections of the top and bottom members and mounting of these members on the spring S is accomplished by first connecting the sections of the bottom member together and then placing the latter in position on the spring as a unit. Inner top section 4 is then placed over the top of spring S and the sides of inner section 7 of the bottom member until the flanges 20 seat beneath the bottom corners of section 7. Finally, top sections 6 and 5, in the order named, are similarly applied to the spring in overlapping relation at their adjacent ends. The slots 22 spring over the protuberances 16 of the respective sections, the side walls 19 engage side walls 11, and the flanges 20 engage the bottom walls 10, when the various sections of the top and bottom members are connected together and mounted upon the spring S, in the manner just described. The protuberances 16 prevent the assembled sections from pulling apart longitudinally, while the tongues 14 prevent separation in a vertical direction.

Downwardly bent spring spacer tongues or members 24 formed on the outer ends of the top walls 18 of the top sections 4 and 6 bear against the top of spring S and force the tops of the telescoping ends of the top sections into close sealing engagement, thus preventing entrance of water at these points. These tongues hold the bottom sections snugly to the spring, and also yieldingly hold the top sections in spaced relation thereto, thus eliminating all looseness and rattling. The space 40 between the top of the leaf spring and the top of the member 2 in addition to providing room for carrying a lubricant, provides ample room for accommodating spring leaves of varying thickness and for curvature of the spring S under deflection. Where the material of which the casing is made is not sufficiently resilient it will be necessary to employ separate spring members 24 of more springy material which may be attached to or placed beneath the ends of sections 4 and 5.

A plurality of stiff springs 25 adapted to span the bottom of the casing, are provided with bent extremities 26 which engage in the perforations 32 and 33 of the protuberances 27 and 34 formed on the side walls of top sections 4, 5, and 6, and bottom sections 7 and 8 respectively. The springs clamp the top sections to each other and to the lower sections and also insure a tight seal at the joints. They also lock the top end sections 4 and 5 to the bottom end sections 7 and 8. It will also be noted that the protuberances 34 seat within the pockets 35 which are produced by pressing the material of the side walls of the upper section outwardly to form these pockets. The body of the springs 25 lie flat against the bottoms of the lower sections and consequently are not liable to be brushed off or otherwise accidently displaced in use.

The sectional cover is lined with a cloth lining member 37 which is inserted in the bottom member 3 of the casing before the latter is mounted on the spring, the character of the cloth being such as to insure a maximum amount of oil or grease being retained. Transverse slits 38 are formed in the lining member 37 adjacent the ends thereof to facilitate doubling the ends back upon themselves by folding the material downwardly and to permit of folding the sides over the sides of the bottom sections. These slits, together with the end folds 31 result in the formation of double walled top end flaps 28 which are adapted to be folded inwardly in overlapping relation one to the other, as illustrated in Fig. 7. The longitudinal marginal side flaps or portions 29 of the lining lying between the two sets of end folds 31 and end flaps 28 are folded outwardly and downwardly over the side walls of the sections 7, 8, and 9, of the bottom member 3 of the casing, as previously explained, and consequently when the sections of the top member 2 are placed over the spring S and over the sections of the bottom member, these side flaps 29 will be tightly clamped between the side walls of the upper and lower sections. The parts of the casing will thus be tightly wedged together and all liability of rattling will be eliminated. Rubber pads 30 are preferably inserted between the plys of the end folds 31 for the purpose of more securely closing the ends of the sectional casing. It will be understood, of course, that the lining will be inserted in the bottom member 3 of the casing, with the bottom and sides of the lining in snug engagement with the bottoms and sides of the several sections comprising the member 3, and that after thorough greasing of the sections and lining, the flaps 28 will be folded inwardly, as illustrated in Figure 7, before the top sections are clamped and locked in place. The extra walls or thickness of lining material provided at the ends of the casing insures absolutely tight joints at these points, where the danger of leakage is greatest.

What I claim is:

1. A casing for flexible vehicle springs, comprising complemental top and bottom sectional sleeved members, a lining member snugly seated in one of said members, said lining member having transverse slits adjacent the ends thereof and its end portions doubled back upon themselves for forming double walled portions at the bottom and sides of the ends of the casing, said end portions forming top flap portions at the ends of the casing for sealing the fourth side at the ends thereof and the middle portion of said lining member being folded outwardly and downwardly to form side portions between said folded end portions clamped between the side walls of said top and bottom members.

2. A casing for flexible vehicle springs, comprising top and bottom sectional sleeved members, a lining member snugly seated in one of said members, said lining member having side portions folded outwardly and downwardly between the sides of the top and bottom members of the casing.

3. A casing for flexible vehicle springs, comprising top and bottom sectional members, means for slidably interengaging the bottom sections to form a unit adapted to enclose three sides of the spring, and means for locking each section of the top member to a corresponding section of the bottom member and independent means for locking the ends of adjacent bottom sections against longitudinal movement, said last means permitting vertical movement of said sections with respect to each other.

4. A casing for flexible vehicle springs, comprising top and bottom members each formed of a plurality of sleeved sections and each adapted to enclose the spring on three sides, perforated locking means on the sections of the top member, spring locking members engaging in said perforations, and integral springing extensions on the top walls of the sleeved sections of said top member for holding one wall of the casing in spaced relation from the spring and drawing the opposite wall of said casing toward said spring.

GEORGE W. CRABTREE.